(12) United States Patent
Spikermann et al.

(10) Patent No.: US 8,968,621 B2
(45) Date of Patent: Mar. 3, 2015

(54) METHOD AND APPARATUS FOR PRODUCING A MULTILAYER CEMENTITIOUS PRODUCT

(75) Inventors: Winfried Johannes Josef Spikermann, Bodenwerder (DE); Kane Ian Ironside, East Leake (GB)

(73) Assignee: BPB Limited, Slough (GB)

( * ) Notice: Subject to any disclaimer, the term of this patent is extended or adjusted under 35 U.S.C. 154(b) by 433 days.

(21) Appl. No.: 10/561,708

(22) PCT Filed: Jun. 23, 2004

(86) PCT No.: PCT/GB2004/002681
§ 371 (c)(1),
(2), (4) Date: Dec. 21, 2005

(87) PCT Pub. No.: WO2005/000769
PCT Pub. Date: Jan. 6, 2005

(65) Prior Publication Data
US 2006/0150868 A1      Jul. 13, 2006

(30) Foreign Application Priority Data
Jun. 24, 2003 (GB) .................................. 0314655.2

(51) Int. Cl.
  *C04B 11/00* (2006.01)
  *G10K 11/162* (2006.01)
  *B29C 39/00* (2006.01)
  *E04B 1/84* (2006.01)
  (Continued)

(52) U.S. Cl.
CPC .............. *C04B 11/002* (2013.01); *E04B 1/8409* (2013.01); *G10K 2210/118* (2013.01); *C04B 11/264* (2013.01); *C04B 18/0445* (2013.01); *G10K 11/162* (2013.01); *B29C 39/003* (2013.01); *C04B 28/145* (2013.01); *C04B 2111/0062* (2013.01)
USPC ............ 264/299; 181/294; 106/735; 428/703

(58) Field of Classification Search
USPC .................. 264/333, 299, 319; 106/783, 735; 181/294; 428/703
See application file for complete search history.

(56) References Cited

U.S. PATENT DOCUMENTS 3,908,062 A * 9/1975 Roberts .................... 442/320
3,947,285 A    3/1976 Jones et al.
(Continued)

FOREIGN PATENT DOCUMENTS

| DE | 27 30 707 | 1/1979 |
| DE | 269295 | 6/1989 |

(Continued)

OTHER PUBLICATIONS

Material Safety Data Sheet for Uncalcined Agricultural Gypsum, Prepared by Product Safety for United States Gypsum Corporation, MSDS # 52-510-D16, Version 6, May 8, 2008.*
(Continued)

*Primary Examiner* — Atul P. Khare
(74) *Attorney, Agent, or Firm* — Cook Alex Ltd.

(57) ABSTRACT

Gypsum plasterboard is produced by combining calcium sulphate hemihydrate (stucco) with water to form an aqueous slurry. Uncalcined gypsum having a specific surface area below 0.3 m$^2$/g is added to the slurry and the slurry is discharged onto a support so as to form a sheet of gypsum plasterboard.

17 Claims, 3 Drawing Sheets

(51) Int. Cl.
*C04B 11/26* (2006.01)
*C04B 18/04* (2006.01)
*C04B 28/14* (2006.01)
*B29C 39/14* (2006.01)
*C04B 111/00* (2006.01)

(56) References Cited

U.S. PATENT DOCUMENTS

| | | | |
|---|---|---|---|
| 4,221,599 A * | 9/1980 | Deleuil | 106/661 |
| 4,286,994 A | 9/1981 | Muller et al. | |
| 4,298,394 A | 11/1981 | Leeming et al. | |
| 4,340,521 A | 7/1982 | Deleuil | |
| 4,645,548 A * | 2/1987 | Take et al. | 156/39 |
| 5,362,471 A * | 11/1994 | Roth et al. | 423/555 |
| 5,366,549 A | 11/1994 | Imaizumi et al. | |
| 5,683,772 A * | 11/1997 | Andersen et al. | 428/36.4 |
| 5,980,627 A * | 11/1999 | Marcoux et al. | 106/461 |
| 6,221,151 B1 | 4/2001 | Campbell et al. | |
| 2002/0139611 A1 * | 10/2002 | Baig | 181/286 |

FOREIGN PATENT DOCUMENTS

| | | |
|---|---|---|
| DE | 41 42 286 | 12/1991 |
| EP | 0 269 736 | 3/1987 |
| EP | 344430 | 3/1988 |
| EP | 344430 A2 * | 12/1989 |
| EP | 0634255 A1 | 1/1995 |
| EP | 1064236 | 9/1999 |
| GB | 521997 | 6/1940 |
| GB | 569596 | 5/1945 |
| GB | 2 073 729 | 10/1981 |
| WO | WO 97/23337 | 7/1997 |
| WO | WO 02/098546 A1 | 12/2002 |
| WO | WO 03/054320 A1 | 7/2003 |

OTHER PUBLICATIONS

Baustoffprospek, "Gypsum Technology," Grenzebach Maschinebau GmbH et al.,www.grenzebach.com, Feb. 2005.

Gyproc Wallboard, Product data sheet DS-001-03, www.british-gypsum.com, Nov. 2008.

Observations by Third Party concerning Patentability of EP1636146, Apr. 19, 2010.

Ullman's Enclopaedia of Industrial Inorganic Chemicals and Products, vol. 1, pp. 589-630 and 632-638 (1999).

Ullman's Encyclopaedia of Industrial Chemistry, pp. 555-584 (1985).

F. Bahner et al., State of the Art Gypsum Wallboard Manufacturing Including the Use of Construction Waste as Raw Material, publication date unknown but prior to Jun. 24, 2003.

* cited by examiner

METHOD AND APPARATUS FOR PRODUCING A MULTILAYER CEMENTITIOUS PRODUCT

This invention relates to a method and apparatus for producing a cementitious product such as a prefabricated building component. Examples of such products include gypsum plasterboards, partition panels, ceiling tiles, glass reinforced gypsum boards and gypsum fibre boards.

Products such as gypsum plasterboard are produced from the basic materials, paper in the form of cardboard, plaster (stucco), water, starch and additives such as an accelerator and foam. Other additives known in the art of making plasterboard such as retarders (e.g. proteins, organic acids), viscosity modifying agents (e.g. superplasticisers), anti-burning agents, water-resisting chemicals (e.g. polysiloxanes, wax emulsions), glass fibres, fire-resistance enhancers (e.g. vermiculite, clays and/or fumed silica) and polymeric compounds (e.g. PVA, PVOH) may be added. Wallboards or plasterboards are large thin gypsum panels covered with cardboard.

The plaster used is made either from natural gypsum (calcium sulphate dihydrate), or synthetic gypsum produced as a by-product of some chemical processes, usually in the β-form. The by-product form most commonly used arises from the flue-gas desulphurisation process in use at a number of coal burning power stations, and is known as desulphogypsum (DSG), which typically is above 95% pure gypsum. Other high quality synthetic forms, such as phosphogypsum and titanogypsum may be used where there is difficulty in obtaining DSG.

The synthetic gypsum is already in particulate form when it is delivered to the plasterboard factory. However it usually has high free moisture content and typically requires drying before the next stage, calcination. Comminution of natural gypsum is necessary, and usually during this stage the natural gypsum is dried. The next stage (using either natural gypsum or synthetic gypsum) known as calcination removes the chemically combined water of crystallization content to produce plaster powder (stucco). This entails turning calcium sulphate dihydrate (gypsum) into calcium sulphate hemihydrate, commonly known as stucco, calcined gypsum or 'Plaster of Paris.'

This powder is then mixed with water to produce a slurry. The slurry produced is then fed onto a continuous sheet of cardboard, covered with a second sheet of cardboard and then passed over a moulding platform to be shaped into an encased strip. This strip of gypsum plasterboard is initially soft but then quickly sets as the calcium sulphate hemihydrate rehydrates back to calcium sulphate dihydrate and therefore hardens and is cut into separate panels. The panels are dried and finished as required.

Ceiling tiles and partition panels are produced by a similar process although the slurry is poured into moulds to produce the desired shape and size. If fibreboards are required the slurry also contains fibres such as cellulose, paper or glass fibres.

The setting and hardening of the slurry can be controlled by numerous additives. Seed accelerators (heterogeneous nucleation) are commonly used to enable the slurry to set more quickly and are typically calcium sulphate dihydrate (gypsum) deliberately ground to a high specific area (above 1.5 $m^2/g$, typically 3-5 $m^2/g$ as measured using BET/nitrogen surface area analysis). Further, the use of co-grinding agents is used to improve the potency and consistency of such accelerators. These co-grinding agents can also temporarily protect the calcium sulphate dihydrate accelerator from acting as a nucleation site when initially mixed with water. For plasterboard manufacture between 0.1 and 2% (w:w stucco) of a seed accelerator is used, but typically 0.5% (w:w stucco), is used. In addition soluble salts such as potassium sulphate ($K_2SO_4$) are known accelerators that advantageously influence the solubility kinetics of calcium sulphate solutions.

It is known that to produce plasterboard with improved sound absorbing qualities then low purity (usually <90% natural gypsum) is used. The impurities present in this low purity gypsum, in particular clays, are considered to increase the acoustic performance by improving the internal damping characteristics and reducing the board stiffness. Further, the increased mass of the plaster necessary to produce plasterboard when using low purity natural gypsum also improves the acoustic performance. However, the presence of other impurities in this low purity natural gypsum can cause difficulties in processing the material. For example, the use of anti-burning agents, increased starch or water usage, or other additives are required to counteract the presence of these deleterious impurities. It is also known that simply increasing the mass of plasterboard made from high purity gypsum, such as DSG will result in an undesirable higher board stiffness.

An aim of the present invention is to alleviate the aforementioned problems associated with producing gypsum board products.

According to the present invention there is provided a method of preparing gypsum board as claimed in the accompanying claims.

Further, according to the present invention there is provided a method of preparing gypsum board comprising the steps of:

a) combining calcium sulphate hemihydrate (stucco) with water to form an aqueous slurry, b) adding uncalcined gypsum to said slurry, c) discharging the slurry onto a support so as to form a sheet of gypsum board wherein said uncalcined gypsum has a specific surface area below 0.3 $m^2/g$.

The uncalcined DSG (synthetic gypsum) particles act as inert fillers in the gypsum board slurry. The particles have a surface area too large to react with the water to any significant extent and thus simply remain particulate and 'bulk out' the plasterboard mixture. This process advantageously produces a board with improved acoustic properties. The DSG is readily available at the manufacturing plant. The use of DSG as an inert filler thus provides cost benefits in that additional materials to act as such fillers need not be sourced.

If the uncalcined gypsum is not dried before being added to the slurry as an inert 'filler' then its inherent moisture content provides the advantage that less water is required for the overall manufacturing process. This also provides cost saving benefits.

Preferably the uncalcined gypsum has a specific surface area within a range of 0.1-0.3 $m^2/g$.

Preferably the uncalcined gypsum has a specific surface area within a range of 0.1-0.2 $m^2/g$.

Preferably the uncalcined gypsum is dried before being added to said slurry.

The uncalcined gypsum may be present in the composition within the range of about 5 to 50% w:w of the stucco.

More preferably the uncalcined gypsum may be present in the composition within the range of about 10-30% w:w of the stucco.

More preferably the uncalcined gypsum may be present in the composition within the range of about 10-20% w:w of the stucco.

The composition may further comprise existing wallboard crushed or milled and added to the slurry to provide additional bulk to the wallboard mixture.

The uncalcined gypsum may be synthetic gypsum.

Also according to the present invention there is provided a cementitious composition comprising a mixture of stucco, uncalcined gypsum and water wherein at least some of the uncalcined gypsum has a specific surface area below 0.3 $m^2/g$.

The invention will now be described by way of example with reference to the accompanying drawings in which.

Figure 1:
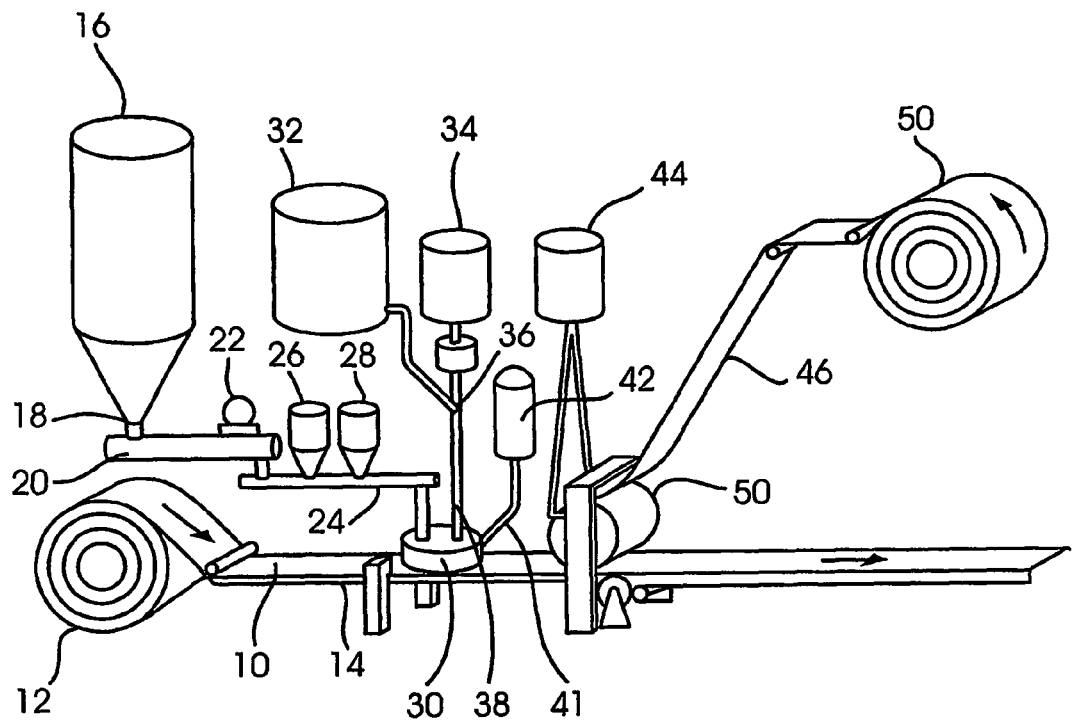
FIG. 1 is a diagrammatic view of the apparatus according to an embodiment of the present invention.

Referring to FIG. 1 a first layer of paper 10 is fed from a roll 12 onto a conveyor or belt 14. A storage container 16 contains slurry of calcium sulphate hemi hydrate and water. This storage container 16 is provided with an outlet 18 connected to a conduit 20. A meter is connected to said conduit 20 for measuring and controlling the amount of stucco fed through the conduit 20.

A further conduit 24 is connected to said conduit 20 and two further storage containers 26 and 28. Each storage container 26, 28 contain appropriate additives used in the plasterboard process. Such additives may comprise retarders (e.g. proteins, organic acids), viscosity modifying agents (e.g. superplasticisers), anti-burning agents, water-resisting chemicals (e.g. polysiloxanes, wax emulsions), glass fibres, fire-resistance enhancers (e.g. vermiculite, clays and/or fumed silica), polymeric compounds (e.g. PVA, PVOH) and other conventional additives imparted in known quantities to facilitate manufacturing.

Conduit 24 is connected at its outlet to a mixer 30. A water container 32 is connected to the conduit 36 of a further additive storage container 34. The container 34 stores further additives such as foaming agents or water. The water and stucco (calcined gypsum) are mixed together in the mixer together with other required additives such as an accelerator or retarder. This process is well known to the man skilled in the art of plasterboard manufacture.

Uncalcined synthetic gypsum is blended with the stucco and then added directly into the mixer 30 via storage container 42. The mixer is provided with an outlet (not shown) to deliver its combined contents in the form of slurry onto the paper 10.

This mixture is then delivered through the outlet onto the paper 10 provided on the moving belt 14.

The slurry stream is then provided with a bonding agent or adhesive and a further layer of paper 46 is provided over its upper surface. The slurry if therefore sandwiched between two sheets of paper or cardboard 10 and 46. These two sheets become the facing of the resultant gypsum board.

The thickness of the resultant board is controlled by a forming station 50 and the board is subsequently prepared by employing appropriate mechanical devices to cut or score fold and glue the overlapping edges of the paper cover sheets 10, 46. Additional guides maintain the board thickness and width as the setting slurry travels on the moving conveyor belt. The board panels are cut and delivered to dryers to dry the plasterboard.

Figure 2:
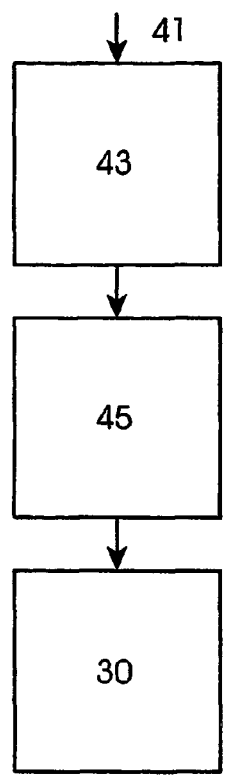
FIG. 2 is a flow chart illustrating the prior art method of manufacturing a standard gypsum board.

Now referring to the flow chart of FIG. 2 the known method of producing plasterboard is shown simplistically. Synthetic gypsum is delivered to the factory in the form of powder with a high free moisture content which requires drying. This moist synthetic gypsum powder 41 is delivered to a dryer 43 which removes the free water (moisture) from the synthetic gypsum powder to produce a dried uncalcined gypsum powder. In general the as-received synthetic gypsum, which has a free moisture content between 5-25%, is processed through a purpose-built drying mill. This mill will disagglomerate any agglomerations; there is no comminution of the gypsum at this stage of the process. Hot combustion gases at approximately 450° C. are used to remove the free moisture, but without causing any calcination of the gypsum.

The next stage 45 known as calcination entails turning calcium sulphate dihydrate ($CaSO_4.2H_2O$) into calcium sulphate hemihydrate ($CaSO_4.½H_2O$). This calcined gypsum (stucco) is then fed into the plasterboard process via the storage container 16.

Figure 3A:
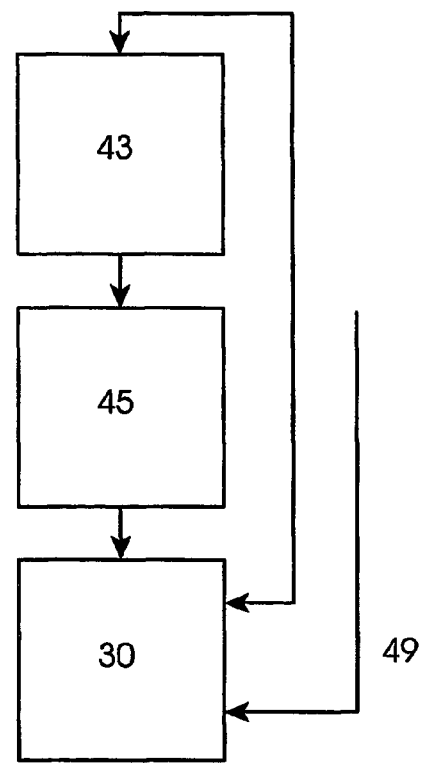
FIG. 3a is a flow chart illustrating a further embodiment of the present invention.
Figure 3:
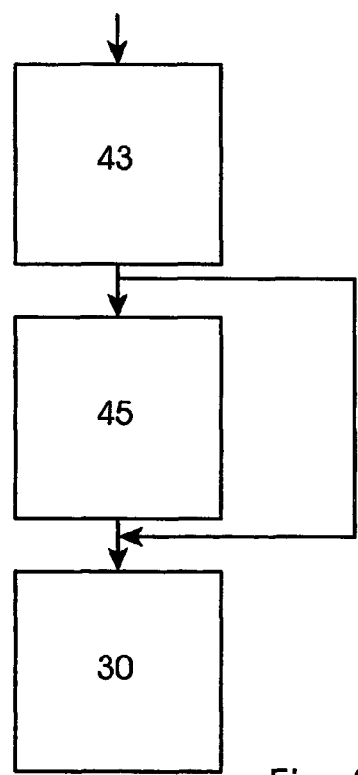
FIG. 3 is a flow chart illustrating an embodiment of the present invention.

The flow chart of FIG. 3 indicates one embodiment of the present invention. In this embodiment, some of the uncalcined synthetic gypsum, which has been dried in the dryer 43, is removed and blended with the stucco before being fed directly into the mixer 30.

This uncalcined synthetic gypsum is mixed with the slurry such that the mixture for the plasterboard contains approximately 80% calcined synthetic gypsum and 20% uncalcined synthetic gypsum. However a range of 10-30% uncalcined synthetic gypsum is preferable. A range of 5% to 50% uncalcined DSG would be acceptable.

In this embodiment of the invention the uncalcined synthetic gypsum added as an additive to the mixer 30 has been dried in the conventional manner before entering the mixer. However in another embodiment of the Invention as shown in FIG. 3a the synthetic gypsum is not dried and is added to the slurry in the mixer 30 in its untreated form containing a high moisture content (5-25% free water). Water can be added to improve processing. Advantageously, this embodiment enables the process to require less process water, eliminates the drying stage and hence reduces costs.

FIG. 3a also shows an additional input, 49, of recycled plasterboard which provides additional 'bulk' to the plasterboard being manufactured. This additional bulk further improves the acoustic properties of the plasterboard.

It is also envisaged that the uncalcined gypsum could be added directly into the mixer as a slurry (i.e. mixed with water).

The uncalcined synthetic gypsum does not act wholly as an accelerator when added to the mixer, as would normally be expected, since the particles of the gypsum are too large and remain inert.

Figure 4:
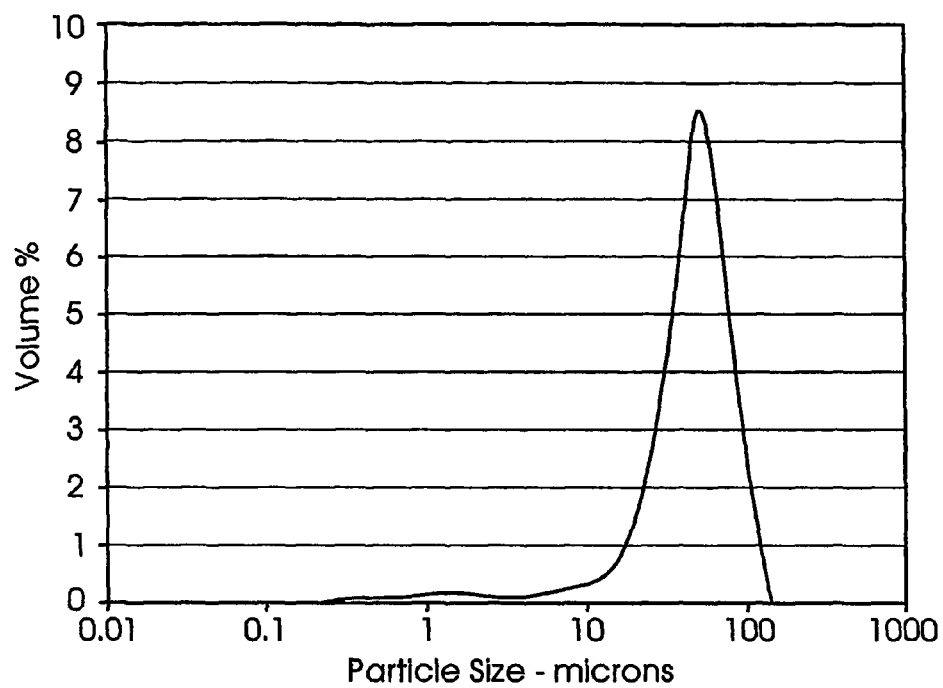
FIG. 4 is a Particle Size Distribution (PSD) for an uncalcined synthetic gypsum, DSG as employed as present in the plasterboard mixture according to the present invention.

FIG. 4 is a typical particle size distribution (PSD) for a synthetic gypsum, DSG used in the present invention. The specific surface area (SSA) for such a DSG is below 0.3 $m^2/g$.

Figure 5:
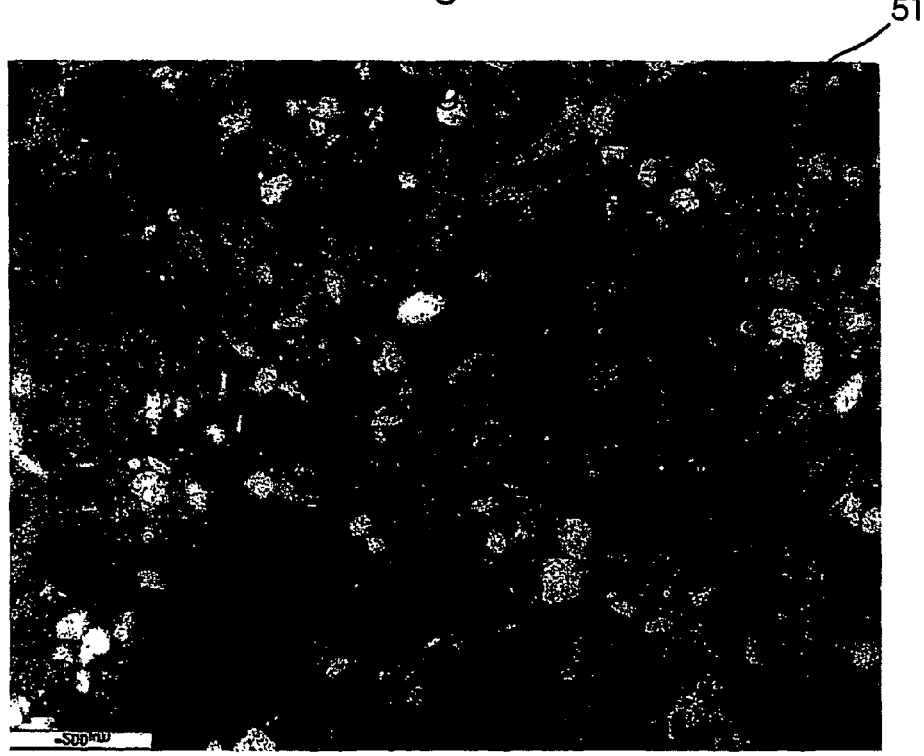
FIG. 5 shows the microstructure of plasterboard containing an uncalcined synthetic gypsum, DSG filler according to the present invention at 100× normal magnification.

FIG. 5 is an example of the uncalcined DSG distribution in the final plasterboard mixture. The DSG particles are clearly visible as the larger dark structures 51.

Advantageously the use of uncalcined DSG to provide additional weight and hence acoustic properties to the wallboard is cost effective since the DSG is already available for the process. No other additives are needed to combat the effect of uncalcined DSG as a 'filler' since it does not react with any of the constituents of the process and so advantageously reduces the board stiffness for improved acoustic performance. It therefore acts as an inert filler effectively providing 'bulk' to the plasterboard hence improving the acoustic properties of the board.

The invention is further described by way of example. The following examples are not intended to limit the scope of the invention.

EXAMPLE 1

A plasterboard manufacturing line was used for this trial. The trial philosophy was to keep the dryer evaporative load constant and to adjust the stucco and dried DSG addition to maintain the target board weight. Dried uncalcined DSG was added to a plasterboard mixture for a 10.2 kg/m² board. The uncalcined DSG particles comprised of a surface area within the range of 0.1-0.3 m²/g.

TABLE I

Plasterboard manufacturing process specifications

| DSG added | (w:w stucco) | 0% | 20% | 25% |
|---|---|---|---|---|
| DSG Wet Weight | (kg/m²) | 15.05 | 14.86 | 14.9 |
| DSG Dry Weight | (kg/m²) | 10.21 | 10.28 | 10.38 |
| Evaporative load | (kg/m²) | 4.84 | 4.58 | 4.52 |
| Water gauge | (%) | 75 | 67.3 | 65.7 |

The water gauge is calculated on stucco and dried DSG contents. As is clear from the above test results the addition of uncalcined DSG provides a water saving advantage as less water is required for the plasterboard manufacturing process if uncalcined DSG is added as an Inert filler. The addition of up to 20% (w:w stucco) dried uncalcined DSG had no or little detrimental effect on the production of plasterboard. Surprisingly no additional process accelerating effects were observed as the DSG particles remained inert. An addition of 25% (w:w stucco) dried uncalcined DSG reduces the evaporative load by 0.32 kg/m² which equates to an 8.2% increase in machine capacity and so line speed.

Table II shows the process feed rates of the test of Table I over a manufacturing time period. Again the water gauge is calculated on stucco and dried DSG content.

TABLE II

| Time | | 10:26 | 10:36 | 10:51 | 11:02 | 11:13 | 11:16 |
|---|---|---|---|---|---|---|---|
| Dried DSG addition | (% w:w stucco) | 0 | 0 | 20 | 20 | 25 | 25 |
| Dried DSG feed | (kg/min) | 0 | 0 | 54 | 54 | 66 | 66 |
| Stucco feed | (T/hr) | 18.7 | 18.7 | 16.6 | 16.6 | 16.1 | 16.1 |
| Foam water | (l/min) | 40 | 40 | 40 | 40 | 40 | 40 |
| Mains water | (l/min) | 194 | 194 | 180 | 181 | 180 | 180 |
| Belt speed | (m/min) | 28.3 | 29.5 | 29.1 | 29.2 | 30.1 | 30.1 |
| Foam concentration addition | (l/min) | 0.16 | 0.16 | 0.16 | 0.16 | 0.16 | 0.16 |
| Accelerator | (kg/min) | 1.9 | 2.1 | 2.5 | 2.67 | 2.96 | 2.68 |
| Starch addition | (kg/min) | 1.24 | 1.5 | 1.8 | 1.5 | 1.5 | 1.5 |
| Glass fibre addition | (kg/min) | 0.5 | 0.55 | 0.45 | 0.45 | 0.5 | 0.52 |
| Superplasticiser addition | (l/min) | 3.1 | 3.2 | 4.5 | 4.5 | 4.5 | 4.5 |
| Retarder addition | (l/min) | 2 | 2 | 3.5 | 3.5 | 3.5 | 3.5 |
| Water gauge | (%) | 63.6 | 63.6 | 56.4 | 56.7 | 55.8 | 55.8 |

EXAMPLE 2

A trial of plasterboard manufacture was conducted on a manufacturing line. The intention was to manufacture an 'acoustic' board (ie one with sound blocking properties). The plasterboard comprised synthetic stucco and 20 wt % dried and uncalcined DSG. This 10 board was then tested for acoustic properties and Table III sets out the comparison with a 'standard' 100% calcined DSG board and a standard 'acoustic' board made with natural rock to provide the sound absorbing properties.

TABLE III

Weighted Airborne Sound Reduction Index (Rw) for 12.5 mm boards in a double layer on 70S50 Gypframe studs with no quilt.

Weighted Airborne Sound Reduction Index - Rw (dB)
(Nominal board weight - 10.6 kg/m²)

| 100% calcined DSG board | 48 | | | |
|---|---|---|---|---|
| DSG board with 20% uncalcined DSG | 49 | 49 | 50 | 51 |
| Acoustic board made with natural rock | 49 | 49 | 49 | 50 |

(The tests conducted in accordance to BS EN ISO 140-3:1995)

It is clear from the above test results that the addition of uncalcined DSG as an inert filler improves the acoustic performance of boards compared with boards made with 100% calcined DSG. Further the performance is comparable to boards manufactured using a low purity natural rock.

EXAMPLE 3

A trial of plasterboard manufacture was conducted in the laboratory. The intention was to measure the set times on adding dried and uncalcined DSG to DSG synthetic stucco. A water gauge of 70% (ml:100 g stucco) and the addition of 0.35% accelerator and 0.5% starch (w:w stucco) was used.

TABLE IV

Set times and bond results.

| Parameter | | Laboratory Run | | |
|---|---|---|---|---|
| Dried DSG Addition | (% w:w stucco) | 0 | 10 | 20 |
| Dry board weight | (kg/m²) | 10.2 | 9.9 | 10.1 |
| Vicat initial set | (m:ss) | 2:45 | 2:45 | 2:45 |
| Vicat final set | (m:ss) | 3:50 | 3:40 | 3:40 |

TABLE IV-continued

Set times and bond results.

| Parameter | | Laboratory Run | | |
|---|---|---|---|---|
| Dried DSG Addition | (% w:w stucco) | 0 | 10 | 20 |
| Wet bond | (%) | 100 | 100 | 100 |
| Dry bond | (%) | 100 | 100 | 100 |

Again the addition of up to 20 wt % of uncalcined DSG had no detrimental effect on the set time of the aqueous gypsum slurry or on bond of the plasterboard.

The invention claimed is:

1. A method of preparing an acoustic gypsum wallboard having improved sound blocking properties, the method comprising steps of:
   a) combining calcium sulfate hemihydrate with water to form an aqueous slurry;
   b) adding an inert filler of uncalcined calcium sulfate dihydrate particles of desulphogypsum (DSG) to the slurry within a range of 20% to 25% w:w of the calcium sulfate hemihydrate, the dihydrate particles having a specific surface area of 0.1-0.3 $m^2/g$ and a particle size distribution of 0.1-1000 microns;
   c) discharging the resulting slurry after step b) onto a support; and
   d) setting the discharged slurry so as to form a sheet of gypsum wallboard having a water gauge reduction with respect to a wallboard containing no uncalcined gypsum,
   wherein the inert filler provides improved acoustic properties to the wallboard.

2. The method of claim 1, wherein the dihydrate particles have a specific surface area of 0.1-0.299 $m^2/g$.

3. The method of claim 1, wherein the dihydrate particles have a specific surface area of 0.1-0.2 $m^2/g$.

4. The method of claim 1, further comprising drying the dihydrate particles before step b).

5. The method of claim 1, further comprising:
   forming a dihydrate slurry by mixing the dihydrate particles with water; and
   conducting step b) by adding the dihydrate slurry to the aqueous slurry.

6. The method of claim 1, further comprising:
   crushing existing wallboard gypsum to a suitable size; and
   adding the crushed gypsum to the aqueous slurry to provide additional bulk improving acoustic properties of the resulting wallboard.

7. The method of claim 1, wherein the water gauge reduction is by 6.9%.

8. The method of claim 1, wherein the water gauge reduction is by 7.2%.

9. The method of claim 1, wherein the water gauge reduction is by 7.7%.

10. The method of claim 1, wherein the water gauge reduction is by 7.8%.

11. The method of claim 1, wherein the water gauge reduction is by 9.3%.

12. A cementitious wallboard having improved acoustic properties produced by the method of claim 1.

13. A cementitious composition for producing an acoustic gypsum wallboard having improved sound blocking properties, the composition comprising a mixture of calcium sulfate hemihydrate, water, and an inert filler of uncalcined calcium sulfate dihydrate particles of desulphogypsum (DSG) in a range of 20% to 25% w:w of the calcium sulfate hemihydrate, the dihydrate particles having a specific surface area of 0.1-0.3 $m^2/g$ and a particle size distribution of 0.1-1000 microns, wherein the composition is discharged as a slurry onto a support and then set into a sheet of gypsum wallboard having a water gauge reduction with respect to a wallboard containing no uncalcined gypsum, and wherein the inert filler provides improved acoustic properties to the wallboard.

14. The composition of claim 13, wherein the dihydrate particles have a specific surface area of 0.1-0.299 $m^2/g$.

15. The composition of claim 13, wherein the dihydrate particles have a specific surface area of 0.1-0.2 $m^2/g$.

16. The composition of claim 13, wherein the slurry further comprises crushed wallboard gypsum of a suitable size providing additional bulk improving acoustic properties of the wallboard.

17. A cementitious wallboard having improved acoustic properties produced from the composition of claim 13.

* * * * *